(12) United States Patent
Stern et al.

(10) Patent No.: US 8,368,525 B2
(45) Date of Patent: Feb. 5, 2013

(54) SYSTEM AND METHOD FOR DISTINGUISHING MESSAGES

(75) Inventors: Edith Helen Stern, Yorktown Heights, NY (US); Patrick Joseph O'Sullivan, Ballsbridge (IE); Robert Cameron Weir, Westford, MA (US); Barry E. Willner, Briarcliff Manor, NY (US); Marjorie Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 12/347,369

(22) Filed: Dec. 31, 2008

(65) Prior Publication Data

US 2010/0164707 A1 Jul. 1, 2010

(51) Int. Cl.
G08B 23/00 (2006.01)
(52) U.S. Cl. ........ 340/500; 709/207; 709/206; 715/805; 715/739
(58) Field of Classification Search .................. 340/500, 340/870.01; 707/10; 709/207, 206, 204; 715/805, 752, 739
See application file for complete search history.

(56) References Cited

U.S. PATENT DOCUMENTS

| | | | |
|---|---|---|---|
| 6,523,012 B1 | 2/2003 | Glassman et al. | |
| 2002/0194280 A1* | 12/2002 | Altavilla et al. | 709/206 |
| 2004/0034774 A1 | 2/2004 | Le Saint | |
| 2004/0073530 A1 | 4/2004 | Stringer-Calvert et al. | |
| 2004/0073801 A1 | 4/2004 | Kalogridis et al. | |
| 2004/0199598 A1* | 10/2004 | Kalfas | 709/207 |
| 2005/0033813 A1 | 2/2005 | Bhogal et al. | |
| 2005/0246658 A1* | 11/2005 | Uemura et al. | 715/805 |
| 2007/0168430 A1* | 7/2007 | Brun et al. | 709/206 |
| 2008/0147805 A1* | 6/2008 | Abecassis et al. | 709/206 |
| 2008/0168026 A1* | 7/2008 | Patil et al. | 707/2 |
| 2008/0228774 A1* | 9/2008 | Hamilton et al. | 707/10 |
| 2009/0125602 A1* | 5/2009 | Bhatia et al. | 709/207 |
| 2009/0254629 A1* | 10/2009 | Bruce et al. | 709/207 |

FOREIGN PATENT DOCUMENTS

| | | |
|---|---|---|
| EP | 1 411 430 A3 | 4/2004 |
| WO | 00/72226 A2 | 11/2000 |

* cited by examiner

*Primary Examiner* — Hoi Lau
(74) *Attorney, Agent, or Firm* — Holland & Knight LLP; Brian J. Colandreo, Esq.; Rory E. Foster, Esq.

(57) ABSTRACT

A method, computer program product, and computing system for associating a time indicator with a message. The time indicator may be indicative of an urgency of a particular task associated with the message. The message having the time indicator may be displayed at a computing device. Numerous other variations and embodiments are also included within the scope of the present disclosure.

19 Claims, 4 Drawing Sheets

SYSTEM AND METHOD FOR DISTINGUISHING MESSAGES

TECHNICAL FIELD

This disclosure relates to a system and method for distinguishing content and, more particularly, to distinguishing messages, such as email, using a visual indication.

BACKGROUND

Today, email and instant messaging are some of the most common forms of communication. These messaging techniques have led to an explosion of messaging in which many people communicate and share content. Messages of particular importance may be marked as such, and identified using a "high importance" identifier.

In a work environment many important messages are received everyday, and although some email messages may be labeled as "high importance" these messages may still be mistakenly overlooked. In some cases, the number of high importance emails received may be overwhelming and may also diminish the relative importance of any one particular email message.

One of the biggest issues concerning email transmission presently is the continuing obstacle of time criticality. As such, emails that may require immediate attention may not be distinguishable from all of the other email messages in a user's inbox.

SUMMARY OF DISCLOSURE

In a first implementation, a method in accordance with the present disclosure may include associating a time indicator with a message. The time indicator may be indicative of an urgency of a particular task associated with the message. The method may also include displaying the message having the time indicator at a computing device.

One or more of the following features may be included. The message may be any of a number of different message types, including, but not limited to, email and instant messages. In some implementations, the time indicator may be a color indicator, a font indicator and/or a typeface indicator.

Further, associating the time indicator with the message may occur prior to transmission of the message, after transmission of the message, or both prior to and after the transmission of the message.

In some implementations, the time indicator may be configured to dynamically update as the urgency of the particular task changes. Moreover, the method may also include receiving a second message having a second time indicator. The second time indicator may correspond to an amended urgency of the particular task.

In some implementations, the method may include receiving the message having the time indicator at a client device. The method may further include editing the time indicator at the client device.

In a second implementation, a computer program product residing on a computer readable medium that may have a plurality of instructions stored on it is provided. When executed by a processor, the instructions may cause the processor to perform operations including associating a time indicator with a message. The time indicator may be indicative of an urgency of a particular task associated with the message. The operations may also include displaying the message having the time indicator at a computing device.

One or more of the following features may be included. The message may be any of a number of different message types, including, but not limited to, email and instant messages. In some implementations, the time indicator may be a color indicator, a font indicator and/or a typeface indicator.

Further, associating the time indicator with the message may occur prior to transmission of the message, after transmission of the message, or both prior to and after the transmission of the message.

In some implementations, the time indicator may be configured to dynamically update as the urgency of the particular task changes. Moreover, the instructions may allow for receiving a second message having a second time indicator. The second time indicator may correspond to an amended urgency of the particular task.

In some implementations, the instructions may allow for receiving the message having the time indicator at a client device. The instructions may further allow for editing the time indicator at the client device.

In a third implementation, a computing system is provided. The computing system may include one or more processors and at least one memory architecture coupled with the one or more processors. The computing system may further include a first software module executed on a first of the one or more processors and the at least one memory architecture, wherein the first software module is configured to associate a time indicator with a message. The time indicator may be indicative of an urgency of a particular task associated with the message. The computing system may additionally include a second software module executed on a second of the one or more processors and the at least one memory architecture, wherein the second software module is configured to display the message having the time indicator at a computing device. In one or more implementations the message may be an email message, text message and/or instant message.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
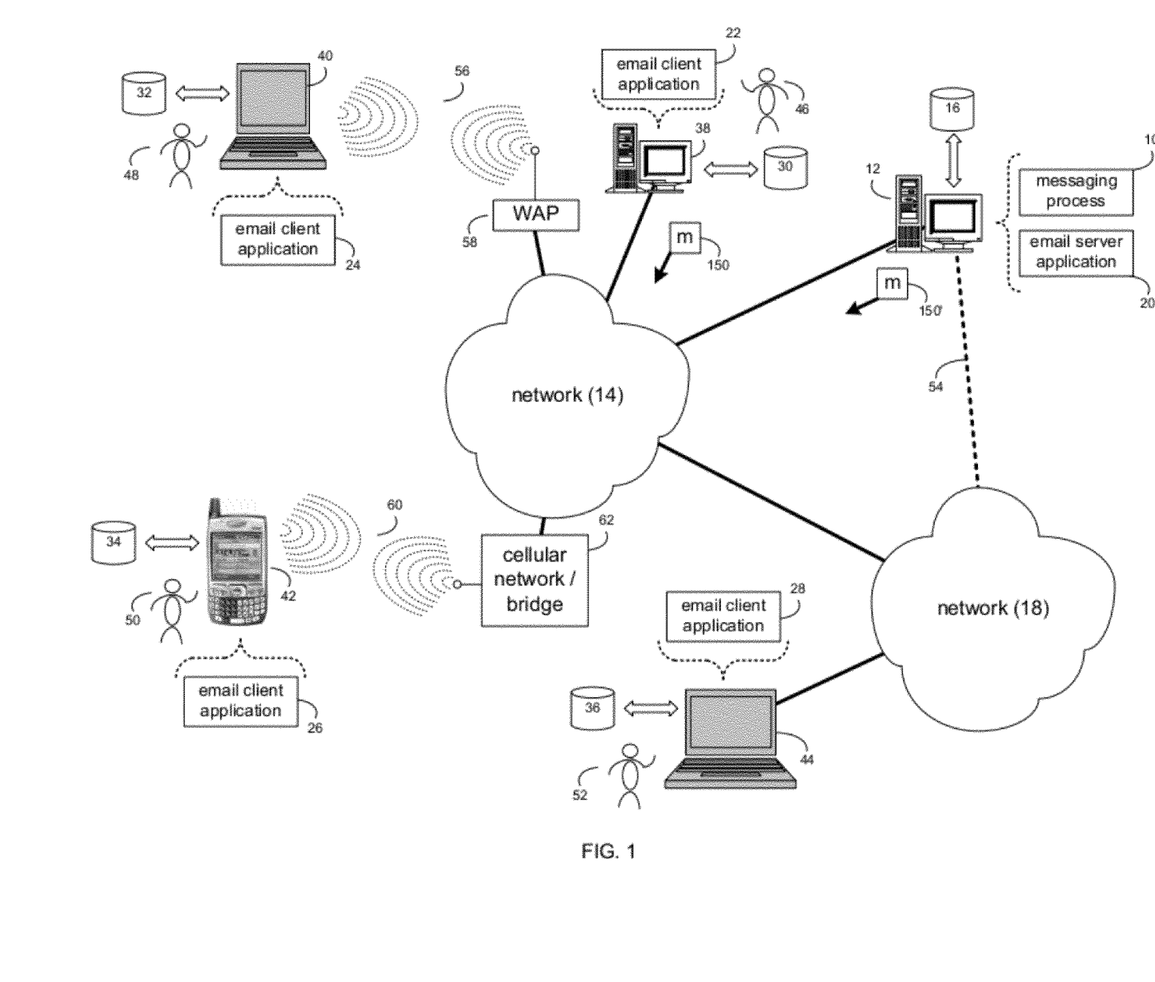
FIG. 1 is a diagrammatic view of a messaging process and an email client application coupled to a distributed computing network.

System Overview:

Referring to FIG. 1, there is shown messaging process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example.

As will be discussed below in greater detail, messaging process 10 may associate a time indicator with a message. The time indicator may be indicative of an urgency of a particular task associated with the message. The message having the time indicator may be displayed at a computing device.

The instruction sets and subroutines of messaging process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute email server application 20, examples of which may include but are not limited to Lotus Domino™ Server and Microsoft Exchange™ Server. Email server application 20 may be a mail transfer agent that may store and route email to one or more email client applications 22, 24, 26, 28, examples of which may include but are not limited to Lotus Notes™ and Microsoft Outlook™. Messaging process 10 may be a stand alone application that interfaces with email server application 20 or an applet/application that is executed within email server application 20.

The instruction sets and subroutines of email server application 20, which may be stored on storage device 16 coupled to server computer 12 may be executed by one or more processors (not shown) and one or more memory architectures (not shown) incorporated into server computer 12.

The instruction sets and subroutines of email client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of computing devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using email client applications 22, 24, 26, 28, users 46, 48, 50, 52 may access email server application 20 and may retrieve and/or organize email messages.

Users 46, 48, 50, 52 may access email server application 20 directly through the device on which the email client application (e.g., email client applications 22, 24, 26, 28) is executed, namely client electronic devices 38, 40, 42, 44, for example. Users 46, 48, 50, 52 may access email server application 20 directly through network 14 or through secondary network 18. Further, server computer 12 (i.e., the computer that executes email server application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

The Messaging Process:

Referring again to FIG. 1, there is shown messaging process 10 that may reside on and may be executed by server computer 12 as part of a server-side system and/or any of client-side devices 38, 40, 42, and 44 as part of a client-side system. Messaging process 10 may be a stand alone application that interfaces with email client application 22 or an applet/application that is executed within email client application 22.

While messaging process 10 will be described below as being executed on personal computer 38 (i.e., a client-side process) associated with a client-side system, this is for illustrative purposes only and is not intended to be a limitation of this disclosure, as other configurations are possible. For example, messaging process 10 may be executed on server computer 12 (i.e., a server-side process), a client-side process (e.g., a client-side messaging process being executed on personal computer 38, a client-side messaging process being executed on laptop computer 40, a client-side messaging process being executed on personal digital assistant 42, or a client-side messaging process being executed on notebook computer 44), or a hybrid server-side/client-side process associated with a hybrid server-side/client side system (e.g., the combination of messaging process 10 and one or more of a client-side messaging process being executed on personal computer 38, a client-side messaging process being executed on laptop computer 40, a client-side messaging process being executed on personal digital assistant 42, or a client-side messaging process 18 being executed on notebook computer 44).

The instruction sets and subroutines of messaging process 10, which may be stored on storage device 16 coupled to server computer 12, may be executed by one or more processors (not shown) and one or more memory architectures (not shown) incorporated into server computer 12.

If messaging process 10 is configured as a client-side process and/or a hybrid server-side/client-side process, all or a portion of the instruction sets and subroutines of messaging process 10 may be stored on storage devices 30, 32, 34, 36 coupled to client electronic devices 38, 40, 42, 44 (respectively) and may be executed by one or more processors (not shown) and one or more memory architectures (not shown) incorporated into client electronic devices 38, 40, 42, 44 (respectively).

Figure 2:
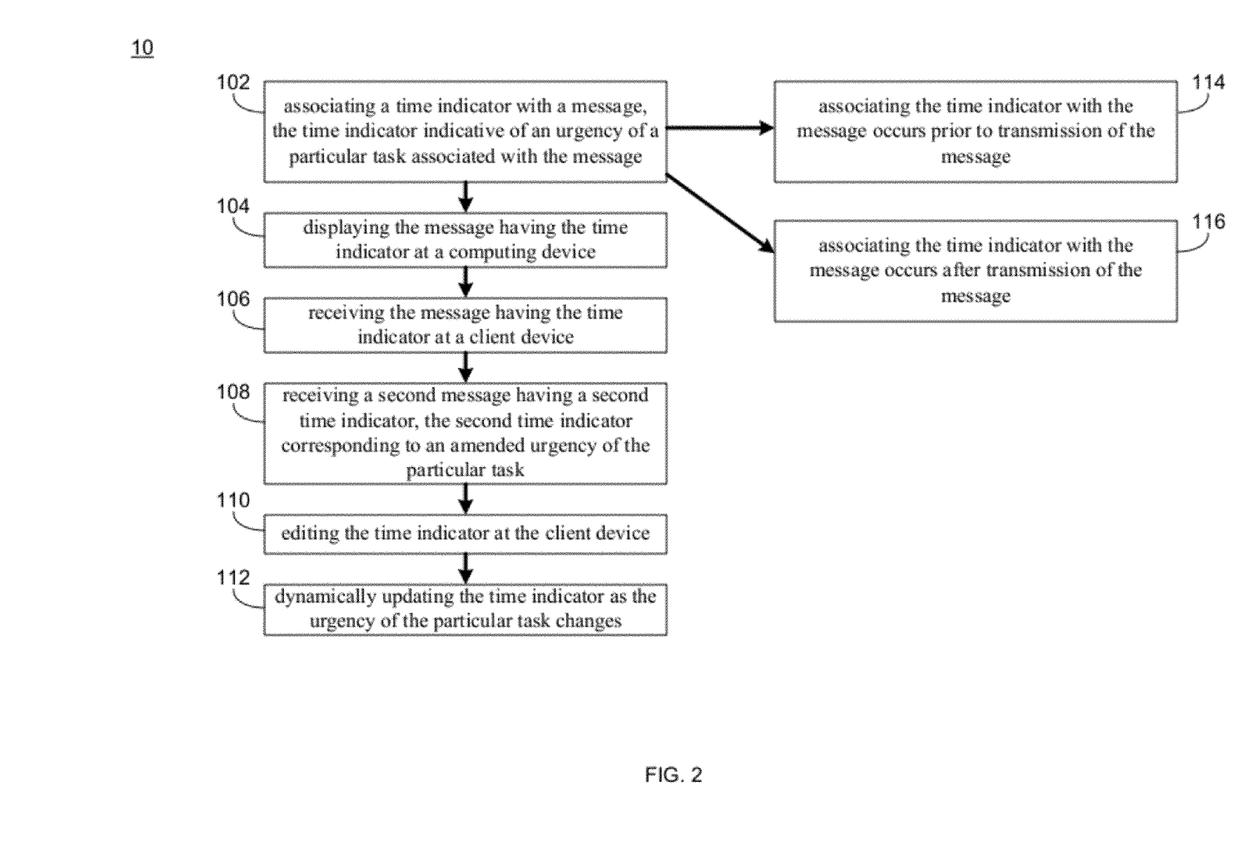
FIG. 2 is a flowchart of a method in accordance with the messaging process of FIG. 1.

Referring now to FIG. 2, a flowchart of a method in accordance with messaging process 10 is shown. The method may include associating a time indicator with a message, the time indicator being indicative of an urgency of a particular task associated with the message. The method may also include displaying the message having the time indicator at a computing device and receiving the message having the time indicator at a client device. In some embodiments, the method may further include receiving a second message having a second time indicator, the second time indicator corresponding to an amended urgency of the particular task. The method may also include editing the time indicator at the client device and dynamically updating the time indicator as the urgency of the particular task changes. Numerous other operations are also within the scope of the present disclosure.

For the following discussion, email client application 22 is going to be described for illustrative purposes. However, this is not intended to be a limitation of this disclosure, as other email client applications (e.g., email client applications 24, 26, 28) may be equally utilized.

Figure 3:
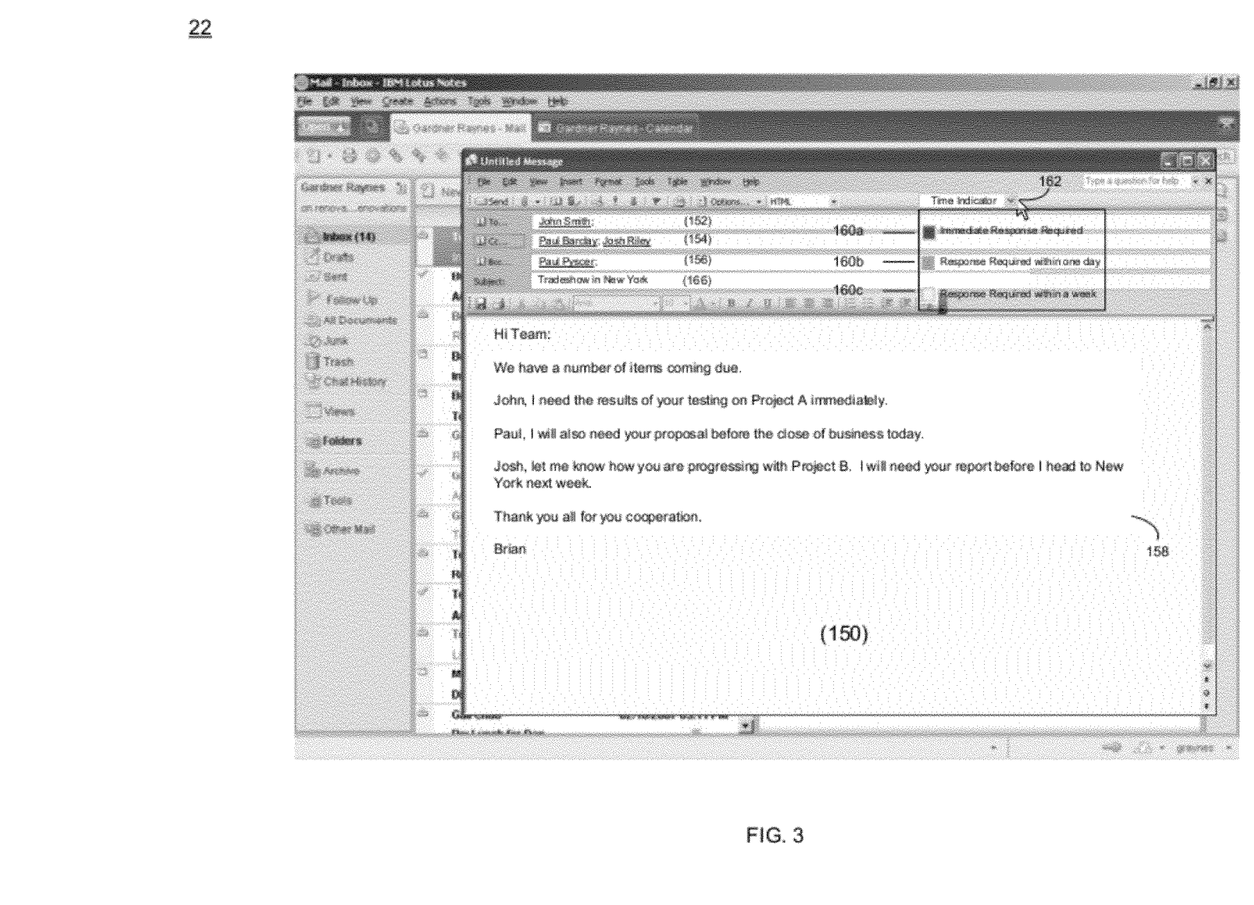
FIG. 3 is a diagrammatic view of a display screen rendered by the email client application of FIG. 1.
Figure 4:
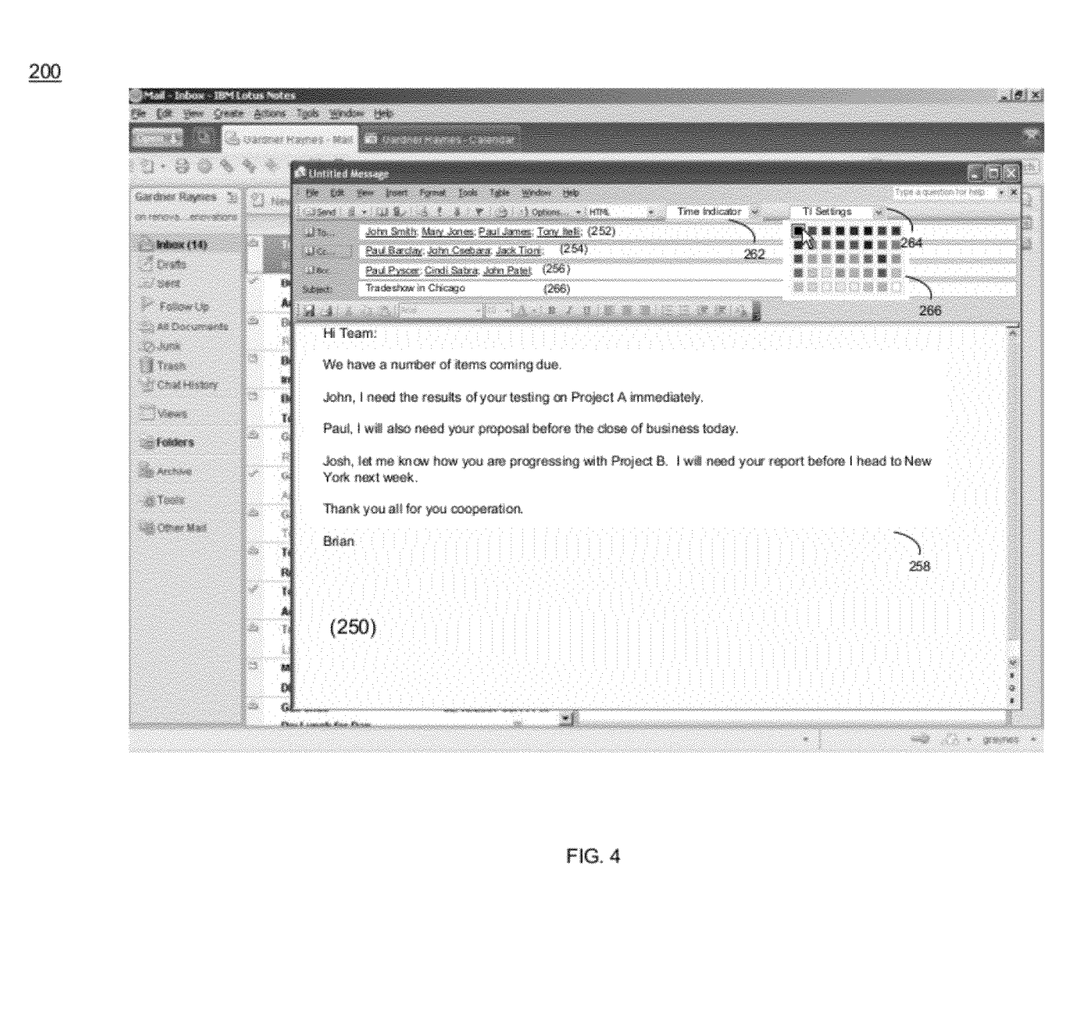
FIG. 4 is a diagrammatic view of a display screen rendered by the messaging process and/or email client application of FIG. 1.

Referring also to FIGS. 3-4, email client application 22 (alone or in combination with messaging process 10 and/or email server application 20) may allow a user (e.g., user 46) to generate an email message 150 that may be addressed to one or more recipients. As is known in the art, email message 150 may be addressed to "TO" recipients 152, "CC" (i.e., carbon copy) recipients 154, and "BCC" (i.e., blind carbon copy) recipients 156. Further, and as is known in the art, email message 150 may include message content 158 (i.e., the body of the email message). While much of the description contained herein is discussed in the context of email messaging, it should be noted that the messages described herein may apply to other forms of messaging, such as instant messaging, text messaging, and the like.

In some embodiments, messaging process 10 may be configured to allow a user (e.g., user 46) to associate a time indicator 160 with a particular message, such as email message 150 (102). Time indicator 160 may be indicative of an urgency of a particular task associated with message 150. For example, process 10 may allow user 46 to be able to indicate a time by which a response to email message 150 needs to be received.

Time indicator 160 may take any of a number of different forms. For example, in some embodiments time indicator 160 may operate using a color scale where a less urgent task is associated with a less urgent color (e.g., yellow) and a more urgent task is associated with a more urgent color (e.g. bright red). This is discussed in further detail below with reference to FIG. 3.

FIG. 3 shows one possible implementation of email client application 22, which may utilize messaging process 10. Email client application 22 may include a time indicator selection feature 162, which may be a drop-down menu or other feature, which may enable a user to associate one of time indicators 160a-c with a particular recipient and/or message. As shown in FIG. 3, time indicator selection feature 162 may be configured to allow a user (e.g., user 46) to select, for example, a bright red color indicator to indicate that an immediate response is required. Alternatively, the user may select other colors depending upon the urgency of the response required. It should be noted that the drop-down menu aspect of time indicator selection feature 162 is only intended to show one possible implementation, other implementations may include, but are not limited to, right-clicking on the recipient's name in any of the appropriate fields, e.g., "TO" recipients 152, "CC" (i.e., carbon copy) recipients 154, and "BCC" (i.e., blind carbon copy) recipients 156, right-clicking in the field itself, etc. Once the recipient and and/or message have been identified the received message may appear in the recipient's inbox displayed with the selected color (e.g. in the subject field). Numerous other implementations are also within the scope of the present disclosure.

In operation, user 46 may be associated with client electronic device 38 and may be attempting to communicate with user 52 who may be associated with client electronic device 44. In this way, user 46 may compose an email message, such as email message 150 and select one of time indicators 160a-c from time indicator selection feature 162. Email message 150 may be transmitted from client electronic device 38 and subsequently received and displayed on client electronic device 44 for viewing by user 52 (104, 106). Email client application 28 may then receive email message 150 and, based upon the time indicator provided, color at least one of the subject line, sender's name, date, etc., in the manner indicated by user 46 in the email inbox of user 52.

Email message 150 may include a number of questions or tasks that may require a response within a certain time frame. For example, an email that has 10 hours until a deadline may include a very faint red time indicator when first received and as the deadline approaches it may change to a brighter red, which may alert user 52 of the urgency of the particular task presented by email message 150. Thus, the selected time indicator may be configured to dynamically update as the urgency of the particular task changes (112). The indicators may be user configurable and may be set by either the sender or the receiver of the message. Specific color schemes, speed of updating, time of color change, etc. may all be set by the user, or alternatively, by an administrator or other rules or policies.

Referring now to FIG. 4, an embodiment showing a time indicator settings feature 264 on an email client application 200 is provided. As discussed above, messaging process 10 may be entirely user configurable (by either the sender or receiver of a particular message). Time indicator settings feature 264 may include a drop down menu or other feature and may allow a user to select a particular color to associate with a particular timeframe. Once the user has set the color to the timeframe the user may then select the color to associate with any message thereafter, as is shown in FIG. 3.

In the example of FIG. 4, the user may select time indicator settings feature 264 and select a color from color palette 266, which may indicate the color that the user wishes to associate with a particular level of urgency. For example, a particular task or message that has 3 days before a response is required may be associated with the color yellow, a message having 2 days before a response is required may be associated with color orange, etc. Messaging process 10 may also permit the user to select the rate at which the colors dynamically change as time passes and the urgency of the particular task has changed. Once the user has indicated his/her preferences using the time indicator settings feature, he/she may select the appropriate time indicator 262 to apply to a given message and/or message recipient.

Further, messaging process 10 may allow a user (e.g., user 52) to activate and/or select a particular time indicator for messages already located in the inbox of email client application 28. As such, messaging process 10 may allow user 52 to implement his/her own color scale and the time span over which a particular email message may change in urgency.

In some embodiments, messaging process 10 may also allow a user (e.g., user 46) to determine from whom and/or to whom he/she may allow time indicator messages to be transmitted to and/or received from. For example, user 46 may indicate that certain important clients and managers may be capable of utilizing this feature, while other less important contacts are not. In some cases, the time indicator may be determined by rules or policies and it should be noted that these rules may be set by user 46, user 52, an administrator or set based on an organizational or other hierarchy. Moreover, messaging process 10 may allow a user that may have to deal with a number of time sensitive emails to select both when a time sensitive email may begin to be colored (e.g., hours to deadline) and how many may be allowed to maintain a bright color indicator level.

Although much of the description contained herein is directed towards the use of color indicators, the present disclosure is not intended to be limited to such uses. For example, time indicator 160 may be configured to alter the words associated with email message 150 using a variety of different techniques. As such, time indicator 160 may be a font indicator, which may indicate the urgency of a task using different font types and/or font sizes. Additionally and/or alternatively, time indicator 160 may also utilize typeface indicators, which may indicate the urgency of a task using varying degrees of bold, italics and/or underline. Messaging process 10 may allow user 46 to apply these indicators to message content 158, subject line 166, and/or any other aspect of email message 150 as desired.

In some embodiments, messaging process 10 may allow a user to associate different time indicators with different recipients of the same message. Referring again to FIG. 3, a message to John Smith, Paul Barclay and Josh Riley may mandate an immediate turnaround for John Smith, a one day turnaround for Paul Barclay and a one week period for reply for Josh Riley. The associated time indicators may be selected by the sender, and subsequently received at each individual client device. For example, user 52 (i.e., John Smith) may receive a bright red indicator on his copy of the email message received through email client application 28 of client electronic device 44. User 48 (i.e., Paul Barclay) may receive an orange indicator on his copy of the email message received through email client application 24 of client electronic device 40 and user 50 (Josh Riley) may receive a yellow indicator on his copy of the email message. Moreover, the user may not select any time indicator for any or all of the recipient's of the message. Numerous other extensions of this concept are also within the scope of the present disclosure.

Since messaging process 10 may operate at the sending side, the receiving side or both, associating the time indicator with the message may occur prior to transmission of the message (114), after transmission of the message (116), or both prior to and after the transmission of the message. As such, messaging process 10 may include receiving the message having the time indicator at a client device, such as client electronic device 38, or alternatively at server device 12. Messaging process 10 may further permit a user to edit the time indicator at the client device before transmitting the message or alternatively, after it has been received (110).

As discussed above, in some embodiments, the time indicator may be set by the recipient of the message. The user may determine that some messages need action and some do not. In this aspect of the invention, messaging process 10 may allow a user to identify which email messages require action and by what time (or in how long) he/she wishes to perform the action. In some embodiments, the time indicator may be activated by right clicking on an email present in the inbox of email application or by right clicking when the email is open. The user may then select the time indicator from a drop down menu or other feature. In the user's inbox (e.g. user 52) the email messages may then be shown by color and the closeness to the set time of action may be shown by color intensity. Thus, for example, messaging process 10 may allow user 52 to sort through the inbox of email client application 28 to determine the messages that include time indicators. Messages having bright red indicators may be at the top of the inbox, etc.

In some embodiments, messaging process 10 may be configured to reset the timing indicator if the deadline for response has expired. This may result in a red message returning to neutral, a boldface message returning to normal typeface, etc. The time indicator may also be configured to decrease if the urgency indicated by the sender has decreased.

In some embodiments, multiple time indicators may be indicated by the sender of the message. For example, information may be urgently needed for a 5 pm customer call, and the request so marked. However, if the request is not satisfied then it may be less urgently needed for a call the next week (e.g., the second timeframe) and after the first deadline is missed, an indicator of lesser urgency may be used. In some embodiments, the urgency may decrease algorithmically once the deadline is past (e.g., linearly).

In some embodiments, the receiver of the message (e.g., user 52) may manually modify the time indicator through his/her email inbox (e.g., email client application 28). In other words, the receiver may satisfy the request or task set forth in the original message using non-email means (e.g., phone call, fax, etc.) and may manually remove the time indicator from the original email message.

In some embodiments, messaging process 10 may be configured to monitor additional information corresponding to an individual user's response patterns to urgent emails. A user may wish to monitor his or her response in order to modify their work patterns or to increase attention paid to a specific requester or group of requestors if they have been left without response by the appropriate time.

Moreover, messaging process 10 may also include receiving a second message having a second time indicator at a client electronic device (108). The second time indicator may correspond to an amended urgency of the particular task introduced by the original message. The process of amending or "updating" a previously sent message is discussed in further detail below.

In operation, user 48 may send a first message including a time indicator to user 52 and if no response has been received may generate an "update" to the first message. This "update" may change or amend the urgency associated with the time indicator of the first message. This may result in motivating an action on the message recipient's side. The mail transfer authority (MTA) associated with the email application may route this notification to the recipient system, which may in turn act on it and/or a) refresh the existing email based on the new content, and b) in the act of refreshing it acknowledge the new temporal values (e.g. revising date sent, revising deadline, alternating colors respectively). Alternatively, user 48 may also relax the constraints by providing a lesser aggressive deadline, e.g., in one instance user 48 may have provided a deadline of one week and may wish to relax this to one month using the same amendment process described above.

As discussed above, in some embodiments, messaging process 10 may be applied within the context of an instant messaging (IM) application. Within each IM session the time from the last received and unresponded to IM may be shown by highlighting its contents using the color indicator. While in some IM systems there may be a time stamp associated with each message, this may not have the visual impact of the color indicator. The change of color may be suppressed for a number of common terms such as "TTYL" (talk to you later), "THX" (thanks), etc. Moreover, a message ending with a question mark ("?") may trigger a corresponding color change as this may indicate an outstanding query. Additionally, messaging process 10 may be configured to scan messages for particular words (e.g., can, what, where, how, etc.) to determine if a message contains a request for a response. The message may return to a default or normal color once the reply has been sent. Of course, the font and typeface indicators discussed above may be applied in the context of text messaging as well.

Some of the embodiments described above may be implemented in a computer program product that may be stored on a storage medium having instructions that when executed by a processor perform the messaging process described herein. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

A number of implementations have been described. Nevertheless, it will be understood that various modifications may be made. Accordingly, other implementations are within the scope of the following claims.

What is claimed is:

1. A method comprising:
receiving, by a client device, a message, wherein the message is associated with a first time indicator and a first intended recipient of the message, said first time indicator indicative of an urgency of a particular task associated with said message, wherein the urgency of the particular task is associated with a deadline to respond to the message;
determining, by the client device, a change of the urgency of the particular task based upon, at least in part, the deadline to respond to the message;
dynamically updating, by the client device, the first time indicator responsive to the determination of the change of the urgency of the particular task associated with the message; and
displaying, by the client device, the updated first time indicator associated with the message;
wherein a second time indicator is associated with the message and with a second intended recipient of the message, the second time indicator different than the first time indicator, the second time indicator indicative of an urgency of another particular task associated with said message, and
wherein the second time indicator is associated with the second intended recipient based upon, at least in part, associating the other particular task with the second intended recipient.

2. The method of claim 1 wherein said message is at least one of an email message and an instant message.

3. The method of claim 1 wherein said first time indicator is at least one of a color indicator, a font indicator and a typeface indicator.

4. The method of claim 1 wherein associating said first time indicator with said message occurs at least one of: prior to transmission of said message, and after transmission of said message.

5. The method of claim 3, wherein said second time indicator is configured to dynamically update as said urgency of said other particular task changes on a second computing device.

6. The method of claim 1 further comprising at least one of:
receiving a second message having a third time indicator, said third time indicator corresponding to an amended urgency of said particular task; and
editing said third time indicator at said client device.

7. A computer program product residing on a non-transitory computer readable medium having a plurality of instructions stored thereon which, when executed by a processor, cause the processor to perform operations comprising:
receiving a message wherein the message is associated with a first time indicator and a first intended recipient of the message, said first time indicator indicative of an urgency of a particular task associated with said message, wherein the urgency of the particular task is associated with a deadline to respond to the message;
determining a change of the urgency of the particular task based upon, at least in part, the deadline to respond to the message;
dynamically updating the first time indicator responsive to the determination of the change of the urgency of the particular task associated with the message; and
displaying the updated first time indicator associated with the message;
wherein a second time indicator is associated with the message and with a second intended recipient of the message, the second time indicator different than the first time indicator, the second time indicator indicative of an urgency of another particular task associated with said message, and
wherein the second time indicator is associated with the second intended recipient based upon, at least in part, associating the other particular task with the second intended recipient.

8. The computer program product of claim 7 wherein said message is at least one of an email message and an instant message.

9. The computer program product of claim 7 wherein said first time indicator is at least one of a color indicator, a font indicator and a typeface indicator.

10. The computer program product of claim 7 wherein associating said first time indicator with said message occurs at least one of: prior to transmission of said message, and after transmission of said message.

11. The computer program product of claim 9, wherein said second time indicator is configured to dynamically update as said urgency of said other particular task changes on a second computing device.

12. The computer program product of claim 7 further comprising instructions for at least one of:

receiving a second message having a third time indicator, said third time indicator corresponding to an amended urgency of said particular task; and editing said third time indicator at said client device.

13. A computing system comprising:
one or more processors;
at least one memory architecture coupled with the one or more processors;
a first software module executed on a first of the one or more processors and the at least one memory architecture, wherein the first software module is configured to receive a message, wherein the message is associated with a first time indicator and a first intended recipient of the message, said first time indicator indicative of an urgency of a particular task associated with said message wherein the urgency of the particular task is associated with a deadline to respond to the message;
a second software module executed on a second of the one or more processors and the at least one memory architecture, wherein the second software module is configured to determine a change of the urgency of the particular task based upon, at least in part, the deadline to respond to the message;
a third software module executed on a third of the one or more processors and the at least one memory architecture, wherein the third software module is configured to dynamically update the first time indicator responsive to the determination of the change of the urgency of the particular task associated with the message; and
a fourth software module executed on a fourth of the one or more processors and the at least one memory architecture, wherein the said fourth software module is configured to display the updated first time indicator associated with the message
wherein a second time indicator is associated with the message and with a second intended recipient of the message, the second time indicator different than the first time indicator, the second time indicator indicative of an urgency of another particular task associated with said message, and
wherein the second time indicator is associated with the second intended recipient based upon, at least in part, associating the other particular task with the second intended recipient.

14. The computing system of claim 13 wherein said message is at least one of an email message and an instant message.

15. The method of claim 1 wherein said first time indicator is a color indicator, said color indicator configured to indicate a plurality of levels of said urgency based upon, at least in part, the plurality of colors.

16. The method of claim 1 wherein said first time indicator is at least one of a font indicator and a typeface indicator, at least one of said font indicator and said typeface indicator configured to indicate a plurality of levels of said urgency.

17. The method of claim 3 wherein one or more of the color indicator, the font indicator and the typeface indicator is configured to change over time based upon, at least in part, comparing a current time with the deadline.

18. The computer program product of claim 9 wherein one or more of the color indicator, the font indicator and the typeface indicator is configured to change over time based upon, at least in part, comparing a current time with the deadline.

19. The computing system of claim 13 wherein said first time indicator is one or more of a color indicator, a font indicator and a typeface indicator, and
wherein one or more of the color indicator, the font indicator and the typeface indicator is configured to change over time based upon, at least in part, comparing a current time with the deadline.

* * * * *